United States Patent [19]

Arita et al.

[11] Patent Number: 5,417,771
[45] Date of Patent: May 23, 1995

[54] SOLDERING FLUX

[75] Inventors: Kazuhiro Arita, Takatsuki; Tetsuro Nishimura, Nishinomiya, both of Japan

[73] Assignees: Takeda Chemical Industries, Ltd.; Nihon Superior Co., Ltd., both of Osaka, Japan

[21] Appl. No.: 290,299

[22] Filed: Aug. 15, 1994

[30] Foreign Application Priority Data

Feb. 16, 1994 [JP] Japan .................................. 6-019117

[51] Int. Cl.⁶ .............................................. B23K 35/34
[52] U.S. Cl. ........................................ 148/23; 148/24
[58] Field of Search ...................................... 148/23–26

[56] References Cited

U.S. PATENT DOCUMENTS 5,127,968  7/1992  Gomi ..................... 148/23
5,131,962  7/1992  Minahara et al. ....... 148/23
5,167,729 12/1992  Takemoto et al. ...... 148/23

OTHER PUBLICATIONS

Derwent Abstract, JP-4-37497 (Feb. 7, 1992).

*Primary Examiner*—Peter D. Rosenberg
*Attorney, Agent, or Firm*—Wenderoth, Lind & Ponack

[57] ABSTRACT

A soldering flux comprising a bis (2-oxazoline) compound, a dithiol compound, an organic carboxylic acid compound and an activator which does not require post-soldering cleaning and, yet, does not cause corrosion of the base metal or deterioration of electrical characteristics and helps to clear the statutory regulations on the use of chlorofluorohydrocarbons.

A soldering flux comprising, in addition to the above components, an organic solvent, a thermoplastic resin or/and an epoxy group-containing compound.

19 Claims, No Drawings

SOLDERING FLUX

BACKGROUND OF THE INVENTION

1. Field of the Invention

This invention relates to a soldering flux.

2. Description of the Related Art

The great majority of soldering fluxes heretofore available comprise a rosin or rosin-modified resin supplemented with an activator consisting of an organic acid and a hydrohalic acid salt.

However, these fluxes leave residues on the substrate surface after completion of the soldering operation and may cause cracks on cyclic heating and cooling and tends to give false "rejects" in the incircuit test because of the failure of the contactor pin to penetrate down to the printed circuit of the board. Furthermore, on moisture absorption and temperature gain, these residues tend to cause corrosion of the base metal and deterioration of the electrical characteristics of printed circuit boards.

Therefore, it is common practice to perform cleaning with a chlorofluorohydrocarbon to remove residues of the flux after the soldering operation.

However, since the cleaning agent chlorofluorohydrocarbons are under rigorous environmental control today, cleaning with them is now a virtually forbidden procedure.

OBJECTS OF THE INVENTION

The object of this invention is to provide a soldering flux free of the above-mentioned problems, that is to say a flux not requiring post-soldering cleaning and yet withstanding cyclic heating and cooling, being compatible with the in-circuit test, with minimum risks of base metal corrosion due to elevation of temperature and humidity and of the aging of electrical characteristics and conforming to the statutory regulations over the use of chlorofluorohydrocarbons through omission of the cleaning operation.

SUMMARY OF THE INVENTION

This invention relates to a soldering flux comprising a bis(2-oxazoline) compound, a dithiol compound, an organic carboxylic acid compound and an activator.

DETAILED DESCRIPTION OF THE INVENTION

The bis(2-oxazoline) compound for use in this invention can be represented by the general formula

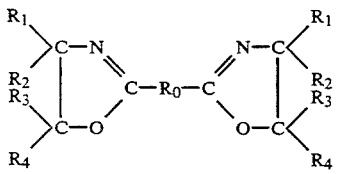

wherein $R_0$ represents a carbon-to-carbon bond or a divalent hydrocarbon residue; each $R_1$, $R_2$, $R_3$ and $R_4$ individually and independently represent a hydrogen atom, an alkyl group or an aryl group. Where $R_0$ is a hydrocarbon residue, it may be an alkylene group, a cycloalkylene group or an arylene group. Where $R_0$ represents a carbon-to-carbon bond, the bis(2-oxazoline) compound may for example be 2,2'-bis(2-oxazoline), 2,2'-bis(4-methyl-2-oxazoline), 2,2'-bis(5-methyl-2-oxazoline), 2,2'-bis(5,5'-dimethyl-2oxazoline), 2,2'-bis(4,4,4', 4'-tetramethyl-2-oxazoline) or the like. Where $R_0$ represents an alkylene group, the bis(2-oxazoline) compound includes 1,2-bis(2-oxazolin-2-yl)ethane, 1,4-bis(2-oxazolin-2-yl)butane, 1,6-bis(2-oxazolin-2-yl)hexane and 1,8-bis(2-oxazolin- 2-yl)octane, among others. Where $R_0$ is a cycloalkylene group, there can be mentioned 1,4-bis(2-oxazolin-2-yl)cyclohexane, among others. Where R is an arylene group, the bis(2-oxazoline) compound includes 1,2-bis(2-oxazolin-2-yl)benzene, 1,3-bis(2-oxazolin-2-yl)benzene (hereinafter referred to briefly as 1,3-PBO), 1,4-bis(2-oxazolin-2-yl)benzene, 1,2-bis(5-methyl-2-oxazolin-2-yl)benzene, 1,3-bis(5-methyl-2 -oxazolin-2-yl)benzene, 1,4-bis(5-methyl-2-oxazolin-2-yl)benzene, 1,4-bis(4,4'-dimethyl-2-oxazolin-2-yl)benzene and so on. The most preferred of them all is 1,3-PBO. These bis(2-oxazoline) compounds can be used independently or in combination.

The dithiol compound for use in this invention may for example be an aliphatic dithiol compound or an aromatic dithiol compound.

The aromatic dithiol compound may for example be an aromatic dithiol compound or a heteroaromatic dithiol compound.

The dithiol compound is represented by the general formula

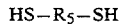

wherein $R_5$ represents an aliphatic hydrocarbon residue, an aromatic hydrocarbon residue or a heteroaromatic residue. The aliphatic dithiol compound includes ethylene glycol bisthioglycolate and butylene glycol bisthioglycolate, among others. The aromatic dithiol compound includes those of 6–14 carbon atoms such as 4,4'-thiobisbenzenethiol, (hereinafter referred to briefly as MPS) bis(4-mercaptophenyl)ether and 3,4-dimercaptotoluene, among others. The heteroaromatic dithiol compound includes those of 3–12 carbon atoms such as 6-dibutylamino-l,3,5-triazine-2,4-dithiol, 6-aminophenyl-1,3,5-triazine-2,4-dithiol, thiadizole and so on. Preferred are MPS and 6-dibutylamino-l,3,5-triazine-2,4-dithiol. In lieu of such dithiol compounds, aromatic mercaptocarboxylic acids such as thiosalicyclic acid can likewise be employed. These compounds can be used independently or in combination.

The organic carboxylic acid compound for use in this invention includes organic mono-, di- and polycarboxylic acids. The organic carboxylic acid may contain hydroxyl groups or double bonds. These compounds serve as the activator as well.

The organic monocarboxylic acid includes aliphatic monocarboxylic acids of 6–21 carbon atoms, such as caproic acid, enanthic acid, capric acid, pelargonic acid, lauric acid, myristic acid, palmitic acid, stearic acid, arachic acid, behenic acid, etc. and aromatic monocarboxylic acids of 7–11 carbon atoms, such as benzoic acid, salicylic acid, anisic acid, anthranilic acid, p-toluenesulfonic acid, 5-sulfosalicylic acid, 4-sulfophthalic acid, sulfanylic acid, naphthalenecarboxylic acid and so on.

The aliphatic dicarboxylic acid includes those of 2–34 carbon atoms, such as oxalic acid, malonic acid, succinic acid, glutaric acid, adipic acid, pimellic acid, suberic acid, azelaic acid, sebacic acid, dodecanedioic acid, dimer acid, eicosanedioic acid and so on. The aromatic dicarboxylic acid includes those of 6–13 carbon atoms, such as phthalic acid, isophthalic acid, naphthalenedicarboxylic acid, diphenylsulfonedicarboxylic acid and diphenylmethanedicarboxylic acid, among others. These species can be used independently or in combination. The organic polycarboxylic acid includes those of 4–8 carbon atoms, such as trimellitic acid, trimesic acid, pyromellitic acid, butane-1,2,3,4-tetracarboxylic acid and so on.

The hydroxyl-containing organic carboxylic acid includes hydroxycarboxylic acids of 3–18 carbon atoms, such as lactic acid, citric acid, tartaric acid, levulinic acid, 12-hydroxystearic acid, etc. The double bond-containing organic acid includes those of 3–36 carbon atoms such as acrylic acid, methacrylic acid, fumaric acid, maleic acid, and so on. These carboxylic acids can be used independently or in combination. Among these organic carboxylic acid compounds, dicarboxylic acid compounds are particularly advantageous in that tough residual films can be obtained.

As an activator for use in this invention, hydrohalic acid salts of various amine compounds can be mentioned. Among such amine compounds are aliphatic primary amines, aliphatic secondary amines, aliphatic tertiary amines, aliphatic diamines, triamines and polyamines, alicyclic amines, aromatic amines, heterocyclic amines, amino alcohols and hydrazine compounds. The aliphatic primary amine includes those of 1–8 carbon atoms, such as methylamine, ethylamine, n-propylamine, n-butylamine, isobutylamine, sec-butylamine, t-butylamine, n-amylamine, sec-amylamine, 2-ethylbutylamine, n-heptylamine, 2-ethylhexylamine, n-octylamine, t-octylamine and so on. The aliphatic secondary amine includes those of 2–16 carbon atoms, such as dimethylamine, diethylamine, di-n-propylamine, isopropylamine, diisopropylamine, di-n-butylamine, diisobutylamine, diamylamine, dioctylamine and so on. The aliphatic tertiary amine includes those of 3–24 carbon atoms, such as trimethylamine, triethylamine, tri-n-propylamine, tri-n-butylamine, triisobutylamine, tri-n-amylamine, tri-n-octylamine and so on.

The aliphatic diamine, triamine and polyamine include compounds of 2–8 carbon atoms, such as ethylenediamine, 1,2-propylenediamine, 1,3-diaminopropane, diethylenetriamine, methylaminopropylamine, dimethylaminopropylamine, triethylenetetramine, 1,6-hexamethylenediamine, 3-diethylaminopropylamine, N-2-hydroxyethylenediamine, tetraethylenepentamine and so on.

The alicyclic amine includes compounds of 6–12 carbon atoms, such as cyclohexylamine and dicyclohexylamine, among others.

The aromatic amine includes compounds of 6–14 carbon atoms, such as aniline, methylaniline, dimethylaniline, diethylaniline, butylaniline, N,N-di-butylaniline, amylaniline, t-amylaniline, N,N-diamylaniline, N,N-di-t-amylaniline, o-toluidine, diethylbenzylamine, benzylamine, o-chloroaniline and so on.

The heterocyclic amine includes compounds of 5–9 carbon atoms, such as pyridine, β-picoline, 2,6-lutidine, isoquinoline, quinoline, pyrrazole, α-picoline, γ-picoline, 2,4-lutidine and so on.

The amino alcohol includes compounds of 2–6 carbon atoms, such as monoethanolamine, diethanolamine, triethanolamine, monoethylethanolamine, mono-n-butylethanolamine, dimethylethanolamine, diethylethanolamine, ethyldiethanolamine, n-butyldiethanolamine, di-n-butylethanolamine, triisopropanolamine and so on.

The hydrazine compound include compounds of 0–7 carbon atoms, such as hydrazine, phenylhydrazine, β-acetylphenylhydrazine, 2-hydroxyethylhydrazine and 1,1-dimethylhydrazine, among others.

The hydrohalic acid salt includes hydrofluorides, hydrochlorides, hydrobromides, etc. Preferred are diethylamine hydrochloride, diethyl amine hydrobromide, ethylamine hydrochloride, ethylamine hydrobromide, 2-ethylhexylamine hydrochloride and 2-ethylhexyl amine hydrobromide.

Regarding the proportions of the respective components for use in this invention, the mol ratio of the dithiol compound and organic carboxylic acid, taken together, to the bis(2-oxazoline) compound is 0.5–1.5 and preferably 0.95–1.05. The amount of the organic carboxylic acid compound relative to the dithiol compound is 5–95 mol % and preferably 10–50 mol %.

The proportion of the activator based on the solid matter of the flux is 0.05–50 weight % and preferably 5–30 weight %. The hydrohalic acid salt component of the activator is not more than 10 weight % and preferably 0.5–5 weight %, based on the total solid matter of the flux.

Where the flux is to be used in a liquid form, an organic solvent can be added. The solvent includes ketones such as acetone, methyl ethyl ketone, etc., alcohols such as methanol, ethanol, isopropyl alcohol, methylcellosolve, ethylcellosolve, butylcellosolve, 1-methoxy-2-propanol, carbitol, butylcarbitol, etc. and aromatic solvents such as toluene, xylene and so on. These solvents can be used independently or in combination.

The organic solvent is used generally in the range of 20–99.5 weight %. If the proportion of the solvent is less than 20 weight %, the viscosity of the flux will become so high as to affect the coatability. If the proportion exceeds 99.5 weight %, the flux will be deficient in the active fraction so that solderability may be adversely affected even in an oxygen-free atmosphere.

The flux of this invention may further contain a thermoplastic resin.

The thermoplastic resin which can be used in this invention includes rosin, modified rosin, rosin-modified resin and synthetic resin, for instance.

As the rosin and rosin-modified resins, there can be mentioned wood rosin, gum rosin, tall rosin, disproportionated rosin, hydrogenated rosin, polymerized rosin and other modified rosin, among others. The synthetic resin includes carboxyl-containing resins such as polyester resins, acrylic resins and styrenemaleic resins, epoxy resins, and resol or novolac phenolic resins, among others. These thermoplastic resins can be used independently or in combination.

The proportion of such thermoplastic resin based on the solid content of the flux is 5–95 weight % and preferably 10–50 weight %.

The flux of this invention may further contain an epoxy group-containing compound.

The epoxy group-containing compound which can be used in this invention includes phenol glycidyl ether compounds, glycidyl ester compounds and glycidyl ether ester compounds.

The phenol glycidyl ether compound includes bisphenol A diglycidyl ether, tetrabromobisphenol A diglycidyl ether, bisphenol F diglycidyl ether, bisphenol S diglycidyl ether and so on. The glycidyl ester compound includes diglycidyl phthalate, diglycidyl terephthaldte, diglycidyl tetrahydrophthalate, dimer acid glycidyl ester, 8,11-dimethyl-7,11-octadecadiene-1,18-diglycidyl ester, n-ethyloctadecane diglycidyl ester and so on. The glycidyl ether ester compound includes p-oxybenzoic acid diglycidyl ester and so on. These compounds can be used independently or in combination.

For accelerating the reaction between the organic carboxylic acid compound and epoxy group-containing compound in this invention, a catalyst may be employed. The catalyst includes quaternary ammonium salts such as triethylbenzylammonium chloride, trimethylbenzylammonium chloride, tetramethylammonium chloride, etc., tertiary amines such as benzyldimethylamine, tributylamine, tris-(dimethylamino)methylphenol, etc. and imidazole compounds such as 2-methyl-4-ethylimidazole, 2-methylimidazole, etc., among others. The proportion of the catalyst based on the solid matter of the flux is 0.2–2 weight %.

The mol ratio of the bis(2-oxazoline) compound and epoxy group-containing compound, taken together, to the dithiol compound and organic carboxylic acid compound, taken together, is 0.8–1.2 and preferably 0.95–1.05. The ratio of the bis(2-oxazoline) compound and expoxy group-containing compound to the dithiol compound and dicarboxylic acid is 5–95 mol %.

In order to reduce the eye fatigue of inspectors and preclude the inspection error of the optical testing system in post-soldering inspections, a matted flux for a dull solder is demanded. With the flux of this invention, this object can be accomplished by using a rosin or rosin-modified resin for part or the whole of said thermoplastic resin and, in combination therewith, a higher saturated or unsaturated aliphatic monocarboxylic acid. The proportions of such rosin or rosin-modified resin and aliphatic monocarboxylic acid based on the solid content of the flux are 5–95 weight % and 2–30 weight %, respectively. The higher saturated or unsaturated monocarboxylic acid which can be used for reducing the solder gloss includes compounds of 8–21 carbon atoms, such as caprylic acid, lauric acid, myristic acid, palmitic acid, stearic acid, arachic acid, behenic acid, oleic acid, linoleic acid, linolenic acid and so on. The hydrohalic acid salt for use in the activator partly gives stable conjugated compounds as the result of reaction with the oxazoline compound and epoxy compound. In order to immobilize more of the hydrogen halide by such reaction, a double bond-containing compound may be added. The double bond-containing compound includes higher unsaturated monocarboxylic acids such as oleic acid, linoleic acid, linolenic acid, etc., and equimolar reaction products between hydroxyethyl acrylate or hydroxyethyl methacrylate and an acid anhydride such as succinic anhydride, maleic anhydride, itaconic anhydride, phthalic anhydride, tetrahydrophthalic anhydride, hexahydrophthalic anhydride, trimellitic anhydride, etc. The proportion of such compound is 1–50 weight % based on the solid content of the flux.

The flux of this invention is a mixture of compounds, each of which is highly reactive, and undergoes reaction under the heat of soldering to give a heat-and moisture- resistant, tough polymer. Therefore, the polymeric film of flux residues after soldering does not undergo cracking even under the thermal shock due to cyclic heating and cooling and, in the in-circuit test using the contact pin, the pin reaches the circuit easily at low pressure. Moreover, the organic carboxylic acid which would otherwise cause corrosion and insulation failure is built into the polymer and the hydrogen halide liberated from the hydrohalic acid salt on heating reacts mostly with the bis(2-oxazoline) compound, with the unreacted residue being trapped and fixed within the polymer. Therefore, even if residues of the flux are not removed by cleaning, there occurs no corrosion or aging of electric characteristics, thus insuring an improved reliability of soldered joints.

Incorporating said thermoplastic resin in a relatively large amount in the flux of this invention results in increased water resistance in unreacted state, improved wetting under the heat of soldering, and improvements in water resistance, toughness and heat resistance of the joints.

Incorporating the epoxy group-containing compound in the flux of this invention results in a marked improvement in the water resistance in unreacted state and in the pot life of the flux after addition of an organic solvent. Moreover, the epoxy group-containing compound reacts with the hydrogen halide liberated from the hydrohalic acid salt on heating, sharing the role of capturing the hydrogen halide with the bis(2-oxazoline) compound.

Incorporating said higher saturated or unsaturated monocarboxylic acid results in matting, that is to say dulling the gloss of the solder.

Incorporating said double bond-containing carboxylic acid compound contributes further to the conversion of the activator hydrogen halide to stable compounds against soldering heat.

Where the dithiol compound represented by the general formula

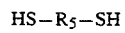

HS—R$_5$—SH wherein R$_5$ represents an aliphatic hydrocarbon residue, an aromatic hydrocarbon residue or a heteroaromatic residue is to be used and the dicarboxylic acid represented by the general formula

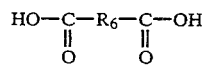

$$\text{HO}-\underset{\underset{O}{\|}}{C}-R_6-\underset{\underset{O}{\|}}{C}-\text{OH}$$

wherein R$_6$ represents an aliphatic hydrocarbon residue or an aromatic hydrocarbon residue is to be used as the organic carboxylic acid compound, there can be obtained a linear copolymer comprising a partial structure of the general formula

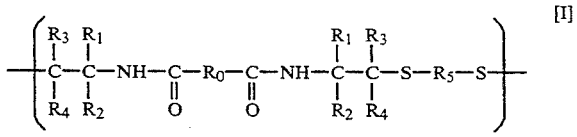

[I]

wherein R$_0$, R$_1$, R$_2$, R$_3$, R$_4$ and R$_5$ represent the same meanings defined above and a partial structure of the general formula

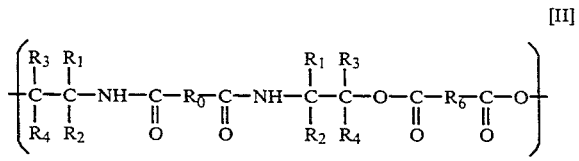

[II]

wherein R$_0$, R$_1$, R$_2$, R$_3$, R$_4$ and R$_6$ represent the same meanings defined above.

The linear copolymer has a weight average molecular weight of 5000–100000.

Where the diepoxy represented by the general formula

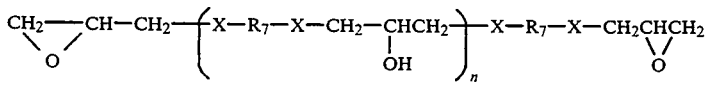

wherein X represents an ether bond or an ester bond and $R_7$ represents an aliphatic hydrocarbon residue, a bisphenolic residue, a phthalic acid residue or an oxybenzoic acid residue and n is o or an integer of 1 to 100 is to be used and the said dithiol compound represented by the general formula

HS—$R_5$—SH wherein $R_5$ represents the same meaning defined above is to be used and said dicarboxylic acid represented by the general formula

wherein $R_6$ represents the same meaning mentioned above is to be used as the organic carboxylic acid compound, there can be obtained a linear copolymer comprising a partial structure of the general formula

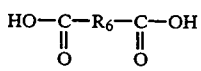 [I]

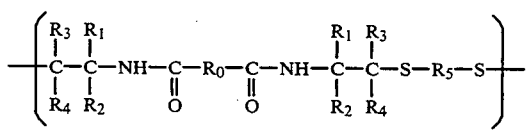

wherein $R_0$, $R_1$, $R_2$, $R_3$, $R_4$ and $R_5$ represent the same meanings defined above, a partial structure of the general formula

[II]

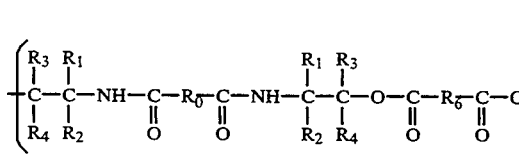

wherein $R_0$, $R_1$, $R_2$, $R_3$, $R_4$ and $R_6$ represent the same meanings defined above, a partial structure of the general formula

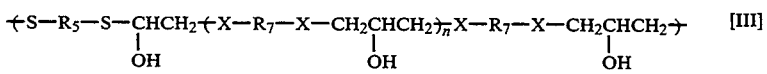 [III]

wherein X, $R_5$, $R_7$ and n represent the same meanings defined above and a partial structure of the general formula

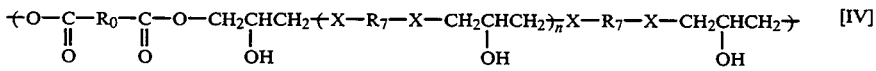 [IV]

wherein X, $R_0$, $R_7$, and n represent the same meanings defined above. The linear copolymer has an intrinsic viscosity of 0.05–1.0.

The flux of this invention undergoes addition polymerization reaction under the heat of soldering to give a heat-resistant, low-hygroscopic and flexible residual film. Therefore, neither cyclic heating and cooling nor external stresses may cause cracks or fractures and, in addition, no defective contact occurs in the in-circuit test because the film is easily pierced by the contact pin. Furthermore, the thermal polymerization reaction converts the organic carboxylic acid and hydrohalic acid salt which would otherwise detract from electrical characteristics to stable compounds or immobilizes them in a stable condition against the ambient atmosphere, with the result that the post-soldering cleaning operation can be omitted. This omission of a production step not only contributes to production cost reduction but helps to clear the statutory regulations on chlorofluorohydrocarbons. The flux of this invention, through the combination of rosin and a higher fatty acid, assumes a dull, matted appearance. This reduces the eye fatigue of inspectors and precludes the assessment error of an optical inspection system.

Furthermore, since the reactivity between the bis(2-oxazoline) compound and dithiol compound is greater than that between the bis(2-oxazoline) compound and dicarboxylic acid compound and the reactivity of the epoxy group-containing compound and dithiol compound is greater than the reactivity between the epoxy group-containing compound and dicarboxylic acid compound, the overall reactivity can be controlled by altering the proportions of these four different reactants.

For example, when the reaction must be consummated in a brief time of the order of seconds as it is the case with the dip soldering of printed circuit boards using a liquid flux and a solder bath or when the reaction is completed in a time of the order of several minutes as it is the case with the reflow soldering of surface-mounted boards using a mixture of flux and solder powders and a reflow furnace, the flux can be tailored to the respective process requirements, thus offering broadened versatility in use.

EXAMPLES

The effectiveness of the soldering flux of this invention is now described in further detail by way of examples and comparison examples. It should be understood that the following abbreviations are used in the examples and comparison examples.

| | |
|---|---|
| ○ 1,3-bis(2-Oxazolin-2-yl)benzene | 1,3-PBO |
| ○ 6-Dibutylamino-1,3,5-triazine-2,4-dithiol (Zisnet (trademark) DB, Sankyo Kasei) | DB |
| ○ Adipic acid | AA |

-continued

| | |
|---|---|
| ○ Succinic acid | SA |
| ○ Bisphenol A glycidyl ether type epoxy compound [Epikote (trademark 828, Yuka Shell Epoxy Co.] | EP-828 |
| ○ Glycidyl ester type epoxy compound (OS-Resin SB-20G, Okamura Seiyu Co.) | SB-20G |
| ○ Diethylamine hydrochloride | DEA · HCl |
| ○ 1-Methoxy-2-propanol | MIPA |
| ○ Isopropyl alcohol | IPA |
| ○ Acrylic resin A: A high acid number acrylic resin; acid number 110, molecular weight 9000, Tg 50° C. | |
| ○ Acrylic resin B: A high acid number acrylic resin; acid number 140, molecular weight 10000, Tg 80° C. | |
| ○ Hydrogenated rosin: Acid number 165–175, softening point 80–87° C., colorless and clear | |
| ○ TMBAC: Trimethylbenzylammonium chloride | |
| ○ Acrylcarboxylic acid: An equimolar reaction product of hydroxyethyl acrylate and hydrophthalic anhydride | |

Example 1

First, 0.507 g of 1,3-PBO, 0.384 g of DB, 0.110 g of SA and 0.046 g of DEA·HCl were respectively weighed and, then, 9.22 g of MIPA was added. The mixture was stirred well to prepare a homogeneous flux solution. This flux was subjected to the tests shown below.

Examples 2–7

According to the formulations shown in Tables 1, 2 and 3, fluxes were prepared and subjected to various tests as in Example 1. The results are shown in Tables 1, 2 and 3.

Comparison Examples 1 and 2

According to the formulations shown in Table 3, fluxes were prepared and subjected to various tests as in Example 1. The results are shown in Table 3.

Example 8

First, 2.4 g of acrylic resin B, 1.6 g of hydrogenated rosin, 0.4 g of AA, 2.4 g of DB, 1.78 g of 1,3-PBO, 1.57 g of SB-20G, 0.5 g of DEA·HCl and 0.05 g of TMBAC were weighed out and, then, 90 g of MIPA was added. The mixture was stirred well to prepare a homogeneous flux solution. The flux thus prepared was subjected to various tests.

| | | Insulation resistance | | | | |
|---|---|---|---|---|---|---|
| Dryness | Spread | Initial | After moistrization | Corrosivity | Solderability | Exfoliation |
| Pass | 82% | $1.7 \times 10^{14}$ ($\Omega$) | $1.4 \times 10^{13}$ ($\Omega$) | None | 1.49 sec. | None |

Using a soldering equipment, the above flux was applied to a printed-circuit board of glass - epoxy resin and dried (100° C.×35 sec.) and soldering (3 sec.) was performed. Because of its low viscosity and good flowability, the flux spread thin and uniform. Moreover, it dried efficiently and caused virtually no bridging, icicling or ball formation in soldering. This flux, as well as a commercial rosin flux was heat-treated at 180° C. for 30 minutes. In each case, the residue was allowed to stand at 50° C.×95% RH for 1 week and the weight gain was determined. The amount of water absorption of this flux, with that of the commercial rosin flux being taken as 100, was 76. Thus, this flux was less hygroscopic.

Example 9

First, 2.0 g of acrylic resin B, 1.34 g of hydrogenated rosin, 0.19 g of AA, 1.47 g of DB, 2.45 g of 1,3-PBO, 0.96 g of SB-20G, 0.35 g of DEA·HCl, 0.05 g of TMBAC, 0.5 g of stearic acid and 0.5 g of linolic acid were weighed out and, then, 90 g of MIPA was added to give a homogeneous flux solution. This flux was applied to a printed circuit board of glass-epoxy resin and dried and soldering was carried out by dipping it in a solder bath at 245° C. for 3 seconds. The solder wettability was very satisfactory and the solder fillet showed a dull gloss or matted appearance.

Example 10

First, 3.77 g of 1,3-PBO, 4.29 g of SB-20G, 4.42 g of DB, 1.27 g of AA, 0.51 g of DEA·HCl, 0.46 g of acrylic A, 0.46 g of acrylic resin B and 0.05 g of TMBAC were respectively weighed and, then, 84.73 g of MIPA was added to prepare a homogeneous flux. This flux was subjected to various tests.

| | | Insulation resistance | | | | |
|---|---|---|---|---|---|---|
| Dryness | Spread | Initial | After moistrization | Corrosivity | Solderability | Exfoliation |
| Pass | 81% | $8.5 \times 10^{12}$ ($\Omega$) | $6.4 \times 10^{12}$ ($\Omega$) | None | 0.9 sec. | None |

This flux was applied to a paper-phenolic resin board and a glass-epoxy resin board, each measuring about 10 cm×15 cm, and soldering was carried out with the flux residues unremoved, each board was subjected to 200 thermal shock cycles each of 30 minutes' cooling at −40° C. and 30 minutes' heating at 80° C. As a result, neither board showed cracks or fractures, nor was found an exfoliation of flux residues.

In the in-circuit test comprising contacting the soldered printed circuit, the contact pin readily pierced through the residue film at a contact force not exceeding 150 g, and as a result, no false test was encountered at all in the in-circuit test. Therefore, these boards could be handled without cleaning in the same way as the board from which the flux residues had been removed by cleaning.

Example 11

|   | Acrylic resin B | Hydro-genated rosin | AA | DB | 1,3-PBO | SB-20G | DEA·HCl | TMBAC | Linolic acid | Acryl-carboxylic acid |
|---|---|---|---|---|---|---|---|---|---|---|
| a. | 2.4 | 1.6 | 0.6 | 1.87 | 1.78 | 1.57 | 0.40 | 0.05 | 2.0 | — |
| b. | " | " | " | " | " | " | " | " | — | " |

The component materials were respectively taken and 90 g of MIPA was added to prepare a homogeneous liquid flux. The solderability of these fluxes were 4.06 seconds for flux a and 2.08 seconds for flux b. This flux was applied to a printed circuit board of glass-epoxy resin measuring 10 cm × 15 cm and heated at 100° C. for 1 minute to evaporate the solvent. The fluxed board was then dipped in a solder bath at 240~245° C. for 3 seconds for soldering. The solderred printed circuit board was allowed to stand in acetone for one day to dissolve the film residues. The acetone solution was then dried by heating under reduced pressure.

The amounts of solid residues were 0.244 g for flux a and 0.191 g for flux b. To each residue was added 50 ml of water and the mixture was boiled on reflux for 3 hours. The boiled mixture was cooled and filtered. The chloride content of the filtrate thus obtained was then determined by ion chromatography. From the value found, the residual amount of the chloride ions contained in the initial flux was calculated. The results were 59% for flux a and 58% for flux b.

The calculated value represents the percentage of chloride ions relative to the solid matter of the flux.

Thus, the amount of chloride ions favoring the corrosion of base metal and aging of electrical characteristics was drastically reduced.

TABLE 1

|   | Composition (g) | Test parameter | Dryness | Spread (%) | Insulation resistance Initial ($\Omega$) | Insulation resistance After moisturization ($\Omega$) | Corrosivity | Solderability (seconds) | Exfoliation |
|---|---|---|---|---|---|---|---|---|---|
| Example 1 | 1,3-PBO | 0.507 | Pass | 83 | $2.3 \times 10^{14}$ | $3.5 \times 10^{13}$ | No corrosion | 0.5 | None |
|   | DB | 0.384 |   |   |   |   |   |   |   |
|   | SA | 0.110 |   |   |   |   |   |   |   |
|   | DEA-HCl | 0.046 |   |   |   |   |   |   |   |
|   | MIPA | 9.22 |   |   |   |   |   |   |   |
| Example 2 | 1,3-PBO | 0.368 | Pass | 81 | $3.2 \times 10^{14}$ | $1.2 \times 10^{14}$ | No corrosion | 0.3 | None |
|   | DB | 0.400 |   |   |   |   |   |   |   |
|   | AA | 0.092 |   |   |   |   |   |   |   |
|   | EP-828 | 0.158 |   |   |   |   |   |   |   |
|   | DEA-HCl | 0.046 |   |   |   |   |   |   |   |
|   | MIPA | 9.22 |   |   |   |   |   |   |   |
| Example 3 | 1,3-PBO | 0.368 | Pass | 81 | $2.2 \times 10^{14}$ | $6.5 \times 10^{13}$ | No corrosion | 0.95 | None |
|   | DB | 0.348 |   |   |   |   |   |   |   |
|   | AA | 0.124 |   |   |   |   |   |   |   |
|   | sion |   |   |   |   |   |   |   |   |
|   | EP-828 | 0.158 |   |   |   |   |   |   |   |
|   | DEA-HCl | 0.046 |   |   |   |   |   |   |   |
|   | MIPA | 9.22 |   |   |   |   |   |   |   |

TABLE 2

|   | Composition (g) | Test parameter | Dryness | Spread (%) | Insulation resistance Initial ($\Omega$) | Insulation resistance After moisturization ($\Omega$) | Corrosivity | Solderability (seconds) | Exfoliation |
|---|---|---|---|---|---|---|---|---|---|
| Example 4 | 1,3-PBO | 0.216 | Pass | 82 | $1.7 \times 10^{14}$ | $4.3 \times 10^{13}$ | No corrosion | 0.65 | None |
|   | DB | 0.272 |   |   |   |   |   |   |   |
|   | AA | 0.146 |   |   |   |   |   |   |   |
|   | EP-828 | 0.370 |   |   |   |   |   |   |   |
|   | DEA-HCl | 0.046 |   |   |   |   |   |   |   |
|   | MIPA | 9.22 |   |   |   |   |   |   |   |
| Example 5 | 1,3-PBO | 0.216 | Pass | 80 | $1.4 \times 10^{14}$ | $3.0 \times 10^{13}$ | No corrosion | 0.5 | Sparse |
|   | DB | 0.272 |   |   |   |   |   |   |   |
|   | AA | 0.146 |   |   |   |   |   |   |   |
|   | EP-828 | 0.370 |   |   |   |   |   |   |   |
|   | DEA-HCl | 0.046 |   |   |   |   |   |   |   |
|   | MIPA | 9.22 |   |   |   |   |   |   |   |
|   | Alkyl-phenol resin | 0.200 |   |   |   |   |   |   |   |
| Example 6 | 1,3-PBO | 0.231 | Pass | 83 | $4.3 \times 10^{13}$ | $1.2 \times 10^{13}$ | No corrosion | 0.7 | Sparse |
|   | DB | 0.242 |   |   |   |   |   |   |   |
|   | AA | 0.130 |   |   |   |   |   |   |   |
|   | EP-828 | 0.395 |   |   |   |   |   |   |   |
|   | DEA-HCl | 0.046 |   |   |   |   |   |   |   |
|   | MIPA | 9.22 |   |   |   |   |   |   |   |
|   | Rosin | 0.010 |   |   |   |   |   |   |   |

TABLE 3

| | Composition (g) | Test parameter | Dryness | Spread (%) | Insulation resistance Initial (Ω) | Insulation resistance After moisturization (Ω) | Corrosivity | Solderability (seconds) | Exfoliation |
|---|---|---|---|---|---|---|---|---|---|
| Example 7 | 1,3-PBO | 0.450 | Pass | 81 | $5.7 \times 10^{13}$ | $1.5 \times 10^{13}$ | No corrosion | 0.6 | None |
| | DB | 0.529 | | | | | | | |
| | AA | 0.121 | | | | | | | |
| | SB-20G | 0.398 | | | | | | | |
| | DEA-HCl | 0.046 | | | | | | | |
| | MIPA | 9.22 | | | | | | | |
| Comparison Example 1 | Rosin | 1.000 | Pass | 91 | $2.2 \times 10^{13}$ | $1.4 \times 10^{11}$ | Discoloration | 0.75 | Yes |
| | AA | 0.130 | | | | | | | |
| | DEA-HCl | 0.046 | | | | | | | |
| | IPA | 7.86 | | | | | | | |
| Comparison Example 2 | Alkylphenol resin | 1.000 | Pass | 89 | $3.3 \times 10^{13}$ | $9.1 \times 10^{11}$ | Discoloration | 1.0 | None |
| | AA | 0.130 | | | | | | | |
| | DEA-HCl | 0.046 | | | | | | | |
| | IPA | 7.86 | | | | | | | |

| Test methods | |
|---|---|
| Dryness | One drop of the flux is dripped on a copper sheet and heated on a hot plate at 230° C. for 5 seconds. After cooling, the sample is evaluated for tackiness with a fingertip. |
| Spreadability | The test is performed in accordance with JIS-Z-3197 6.10 |
| Insulation resistance | The test is performed in accordance with JIS-Z-3197 6.8 [Test board: Type 2 comb electrode] |
| Corrosivity | The test is performed in accordance with JIS-Z-3197 6.6.1 |
| Solderability | A test copper sheet (7 mm wide × 0.3 mm thick) oxidized at 150° C. for 1 hour is dip-coated with the flux and, then, dipped in a solder bath (Solder H63A) controlled at 245 ± 2° C. The time in which the solder surface regains horizontality is determined (meniscograph method). |
| Exfoliation | The resistance to exfoliation of flux residues on flexure of a testpiece. |

Example 12

A cylindrical reactor maintained at 230° C. was charged with 21.6 g (0.1 mol) of 1,3-PBO, 13.6 g (0.05 mol) of DB and 7.3 g (0.05 mol) of AA and the charge was stirred for about 15 minutes to provide a copolymer. This copolymer was clear, hard and soluble in dimethylformamide, dimethyl sulfoxide and N-methylpyrrolidone.

The decomposition temperature (10% weight loss) as determined by differential thermal analysis was 330° C. Nuclear magnetic resonance spectrometry ($^1$H-NMR, 400 MHz, d$_6$-DMSO) revealed chemical shifts assignable to

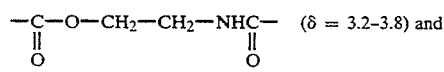 (δ = 3.2–3.8) and

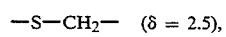 (δ = 2.5), all of which were formed as the result of reaction, indicating that it was a thioether-ester-amide copolymer. Its average molecular weight as determined by GPC/LALLS was 41600.

Example 13

A cylindrical reactor maintained at 225° C. was charged with 21.6 g (0.1 mol) of 1,3-PBO, 12.5 g (0.05 mol) of MPS and 7.5 g (0.05 mol) of AA and the charge was stirred for about 2 minutes to provide a copolymer.

This copolymer was clear, hard and soluble in dimethylformamide, dimethyl sulfoxide and N-methylpyrrolidone.

The decomposition temperature (10% weight loss) as determined by differential thermal analysis was 350° C. Nuclear magnetic resonance spectrometry ($^1$H-NMR, 400 MHz, d$_6$-DMSO) revealed chemical shifts assignable to

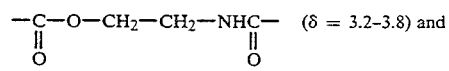 (δ = 3.2–3.8) and

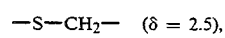 (δ = 2.5), all of which were formed as the result of reaction, indicating that it was a thioether- ester-amide copolymer. Its average molecular weight as determined by GPC/LALLS was 52200.

Example 14

A cylindrical reactor maintained at 225° C. was charged with 9.1 g (0.0042 mol) of 1,3-PBO, 15 g (0.006 mol) of MPS and 6.7 g (0.0018 mol) of Epikote 828 (trademark, Yuka Shell Epoxy Co.) and the charge was stirred for about 1.5 minutes to provide a copolymer. This copolymer was clear, hard and soluble in dimethylformamide, dimethyl sulfoxide and N-methylpyrrolidone.

The decomposition temperature (10% weight loss) as determined by differential thermal analysis was 360° C. Nuclear magnetic resonance spectrometry ($^1$H-NMR, 400 MHz, d$_6$-DMSO) revealed chemical shifts assignable to

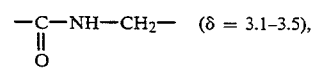 (δ = 3.1–3.5),

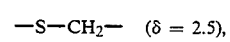 (δ = 2.5), all of which were formed as the result of reaction, indicating that it was a thioether-amide copolymer. Its average molecular weight as determined by GPC/LALLS was 54900.

Example 15

A cylindrical reactor maintained 227° C. was charged with 8.2g (0.038 mol) of 1, 3-PBO, 9.62g (0.035 mol) of DB, 9.35g (0.016 mol) of SB-20G and 2.76g (0.019 mol) of AA and the charge was stirred for about 5 minutes to provide a copolymer. This copolymer was clear, hard and soluble in dimethylformamide, dimethyl sulfoxide and N-methyl pyrrolidone. The decomposition temperature (10% weight loss) as determined by differential thermal analysis was 305° C. Nuclear magnetic resonance spectrometry ($^1$H-NMR, 400 MHz, d$_6$DMSO) revealed chemical shifts assignable to

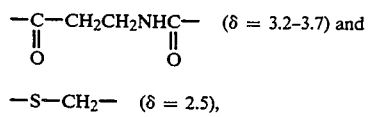

all of which were formed as the result of reaction, indicating that it was a thioether-ester - amide copolymer. The intrinsic viscosity was 0.18 (0.3 wt % in dimethylformamide at 25° C.).

Example 16

A cylindrical reactor maintained 228° C. was charged with 6.48g (0.03 mol) of 1,3-PBO, 9.62g (0.035 mol) of DB, 7.4g (0.02 mol) of Epokote 828 (trademark, Yuka Shell Epoxy Co.) and 2.19g (0.015 mol) of AA and the charge was stirred for about 5 minutes to provide a copolymer. This copolymer was clear, hard and soluble in tetrahydrofuran, dimethylformamide, dimethyl sulfoxide and N-methyl pyrrolidone. The decomposition temperature (10% weight loss) as determined by differential thermal analysis was 310° C. Nuclear magnetic resonance spectrometry ($^1$H-NMR, 400 MHz, d$_6$DMSO) revealed chemical shifts assignable to

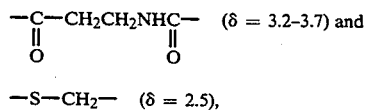

all of which were formed as the result of reaction, indicating that it was a thioether-ester-amide copolymer. The intrinsic viscosity was 0.127 (0.3 wt % in dimethybformamide at 25° C.).

Example 17

A cylindrical reactor maintained 225° C. was charged with 7.56g (0.035 mol) of 1,3-PBO, 5.55g (0.015 mol) of Epikote 828 (trademark, Yuka Shell Epoxy Co.), 8.16 g (0.03 mol) of DB, 1.25 g (0.005 mol) of MPS and 2.19 g (0.015 mol) of AA and the charge was stirred for about 4 minutes to provide a copolymer. This copolymer was clear, hard and soluble in tetrahydrofuran, dimethylformamide, dimethyl sulfoxide and N-methyl pyrrolidone. The decomposition temperature (10% weight loss) as determined by differential thermal analysis was 305° C. Nuclear magnetic resonance spectrometry ($^1$H-NMR, 400 MHz, d$_6$DMSO) revealed chemical shifts assignable to

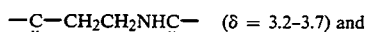

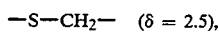

all of which were formed as the result of reaction, indicating that it was a thioether-ester-amide copolymer. The intrinsic viscosity was 0.106 (0.3 wt % in dimethybformamide at 25° C.).

What is claimed is:

1. A soldering flux comprising a bis(2-oxazoline) compound, a dithiol compound and an organic carboxylic acid compound.

2. The soldering flux of claim 1 further comprising an organic solvent.

3. The soldering flux of claim 1 further comprising a thermoplastic resin.

4. The soldering flux of claim 3, wherein the thermoplastic resin is rosin or carboxyl-containing acrylic resin.

5. The soldering flux of claim 1 further comprising an epoxy group-containing compound.

6. The soldering flux of claim 5, wherein the proportion of the epoxy group containing compound relative to the bis (2-oxazoline) compound is 5–95 mol %.

7. The soldering flux of claim 1, wherein the dithiol compound is a heteroaromatic dithiol compound.

8. The soldering flux of claim 7, wherein the heteroaromatic dithiol compound is 6-dibutylamino-1,3,5-triazine-2,4-dithiol.

9. The soldering flux of claim 1, wherein the organic carboxylic acid compound is an aliphatic monocarboxylic acid, dicarboxylic acid or polycarboxylic acid.

10. The soldering flux of claim 9, wherein the aliphatic dicarboxylic acid is one having 2–34 carbon atoms.

11. The soldering flux of claim 9, wherein the aliphatic dicarboxylic acid is succinic acid or adipic acid.

12. The soldering flux of claim 1, wherein the mol ratio of the dithiol compound and the organic carboxylic acid compound combined to the bis(2-oxazoline) compound is 0.5–1.5 and the proportion of the organic carboxylic acid compound based on the dithiol compound is 5–95 mol %.

13. The soldering flux of claim 1 which contains 0.05–50 weight percent of the activator.

14. The soldering flux of claim 1, wherein the activator is a hydrohalic acid salt of an aliphatic secondary amine.

15. The soldering flux of claim 14, wherein the hydrohalic acid salt of the aliphatic secondary amine is diethylamine hydrochloride.

16. The soldering flux of claim 1 further comprising a double bond-containing compound.

17. The soldering flux of claim 16, wherein the double bond-containing compound is a reaction product of hydroxyethyl acrylate and hydrophthalic anhydride.

18. The soldering flux of claim 16, wherein the double bond-containing compound is a higher unsatunated aliphatic monocarboxylic acid.

19. The soldering flux of claim 1 further comprising a hydrohalic acid salt of an amine compound as an activator.

* * * * *